(12) United States Patent
Huang

(10) Patent No.: US 7,703,216 B2
(45) Date of Patent: Apr. 27, 2010

(54) AUTOMATIC LOCKING MECHANISM FOR A MEASURING TAPE DEVICE

(75) Inventor: Jason Huang, Taipei (TW)

(73) Assignee: Index Measuring Tape Co., Ltd, Taipei (TW)

( * ) Notice: Subject to any disclaimer, the term of this patent is extended or adjusted under 35 U.S.C. 154(b) by 36 days.

(21) Appl. No.: 12/211,209

(22) Filed: Sep. 16, 2008

(65) Prior Publication Data

US 2010/0064540 A1   Mar. 18, 2010

(51) Int. Cl.
 *G01B 3/10* (2006.01)
(52) U.S. Cl. ...................................... 33/767; 242/381.2
(58) Field of Classification Search .................... 33/757, 33/758, 760, 761, 767; 242/381.1, 381.2
See application file for complete search history.

(56) References Cited

U.S. PATENT DOCUMENTS

| | | | | |
|---|---|---|---|---|
| 6,276,071 | B1 * | 8/2001 | Khachatoorian | 33/767 |
| 6,470,590 | B1 * | 10/2002 | Lee | 33/767 |
| 6,595,451 | B1 * | 7/2003 | Kang et al. | 242/381.2 |
| 6,612,046 | B1 * | 9/2003 | Cimorell et al. | 33/668 |
| 6,836,975 | B2 * | 1/2005 | Lin | 33/767 |
| 6,892,468 | B2 * | 5/2005 | Murray | 33/761 |
| 2003/0042349 | A1 * | 3/2003 | Lin | 33/767 |
| 2003/0141399 | A1 * | 7/2003 | Kang et al. | 33/767 |
| 2006/0000106 | A1 * | 1/2006 | Lin | 33/767 |
| 2007/0056182 | A1 * | 3/2007 | Di Bitonto et al. | 33/767 |
| 2009/0064526 | A1 * | 3/2009 | Farnworth et al. | 33/767 |

* cited by examiner

*Primary Examiner*—G. Bradley Bennett
(74) *Attorney, Agent, or Firm*—Lowe Hauptman Ham & Berner, LLP

(57) ABSTRACT

A measuring tape device with automatic locking mechanism comprises of a casing, a bobbin that is set within the casing with a spring, a coilable tape that is contained in the casing. One end of the tape is connected to the spring and is wound around the bobbin, while the other end is extended outside through an aperture that is formed at the lower end to of casing, and this other end is connected to a hook member. The device also comprises of a stopper, it consists of an end that is positioned on the linear portion of tape, and an actuator that is connected to the end portion by a linkage part. The actuator is extruded outside and is settled at the surface of the casing. The device includes a hinge joint for fixating the stopper inside the casing and for allowing the stopper to rotate, and an elastic member placed between the casing and the linkage portion. The measuring tape device of present invention will lock the tape in place after the tape is extracted out from the casing, the locking mechanism of the tape is considered effective, and it has relatively low production cost, hence it is beneficial for mass production.

8 Claims, 2 Drawing Sheets

AUTOMATIC LOCKING MECHANISM FOR A MEASURING TAPE DEVICE

BACKGROUND OF THE INVENTION

1. Field of the Invention

The present invention relates to a measuring tape device, in particular, it refers to a measuring tape device that has an automatic locking to mechanism.

2. Description of Prior Art

With the increasing demand for surveying, the measuring tape devices get to be more widely used. An early conventional measuring tape device comprises of a casing, there is a coilable tape contained inside the casing. At the center of the casing is a bobbin, one end of the tape is connected to the bobbin with a spring, and the other end of the tape extends out of the casing through an aperture. This type of measuring tape device does not have a locking mechanism, when a user release the distal end of the tape after the tape is extracted out of the casing, the tape is immediately retracted back into the casing, so it is inconvenient for the user to read the measurement on the tape.

According to Chinese Patent Publication (No. CN 2767951Y), in which it disclosed an utility model entitled "A measuring tape device with an automatic position locking", the construction of the measuring tape device is as shown in FIG. 1, it comprises of a casing 1, in the center of which is a bobbin 4 that is connected to a spring. One end of a coilable tape 2 is connected to the bobbin 4 and is wound around the bobbin 4 inside the casing, while the other end of the tape extends out of casing 1 through an aperture that is formed on the lower end of the casing. Inside the casing near the location of the aperture is a stopper 3, the stopper 3 is positioned above the linear part of the tape 2 that reaches the aperture. At the upper end of the casing 1 is a button 5, the front end of the button 5 is a "J" shape extension piece, and the end of the "J" shape extension piece is settled against the back of the stopper 3. In between the casing 1 and the stopper 3 is a spring 6, the spring 6 is for exerting a force of restoration onto the stopper 3.

In its natural state, the stopper 3 is spring-loaded to be biased towards the tape 2, causing the stopper 3 to come in contact with the linear part of the tape 2, and thus exerting a friction against the tape 2, the tape 2 is then locked in place, and user can readily read the measurement on the tape. When the user need to retract the tape back into the casing, the user presses the button 5, so the stopper 3 is pushed by the "J" shape extension piece that is at the front end of the button 5, which causes the stopper 3 to depart from the tape 2, the tape 2 is then retracted back into the casing by the spring loading.

However, this kind of measuring tape device consists of too many components, so the structure of the device becomes too complicated, and the production cost becomes too high. Furthermore, since the locking mechanism of the measuring tape depends on the "J" shape extension piece at the front end of button 5 to move the stopper 3, if the contact between the "J" shape extension piece and the stopper 3 deteriorates due to extensive usage, the effectiveness of the locking mechanism of the measuring tape will be affected, which decreases the reliability of the locking mechanism.

SUMMARY OF THE INVENTION

The main object of present invention is to provide a measuring tape device that has a simple structure and a more reliable locking mechanism.

To accomplish the above object, the measuring tape device presented in this invention comprises of a casing that contains a coilable tape, in the center of the casing is a bobbin, the bobbin is connected to the casing with a spring. A coilable tape is also contained inside the casing, one end of the tape is connected to a spring and the tape is wound around the bobbin set inside the casing, the other end of the tape extends outside through the aperture that is formed on the lower end of casing and is connected to a hook member. Wherein the measuring tape device also comprises of a stopper, the stopper consists of an end that is positioned on top of the measuring tape of the linear part inside the casing, and the stopper is connected to an actuator by a linkage part. At the upper end of the linkage part near the actuator is a hinge joint, the hinge joint fixates the stopper inside the casing, and allows the stopper to rotate. Between the casing and the linkage part of the stopper is an elastic piece, one end of the elastic piece is fixated at the lower end of the wall inside the casing near the aperture, while the other end is fixated to the linkage part of the stopper. Below the end of the stopper is a corresponding block, between the end of stopper and the corresponding block is a gap where the linear part of the tape passes.

One embodiment of present invention is to sheath the end of the stopper with a frictional piece, the frictional piece could be made of material that generates large friction, such as rubber or synthetic resin, against a smooth tape surface. The linkage part of the stopper is a vertical lever formed between the end of the stopper and the linear part of the tape at an angle "α" greater than 90 degrees.

In its natural position, the linkage part of the stopper is elastically biased towards the tape, thus causes the end of stopper to come in contact with the linear part of the tape. Due to the end of the stopper is sheathed by a frictional piece, a large friction is then generated between the end of the stopper and the linear part of the tape, such friction causes the tape to be locked in its particular position. If a user wants to release the locking mechanism, the user only needs to press the actuator. When the users press down the actuator, the stopper rotates the hinge joint, the linkage part of the stopper then shifts towards the wall of the casing, which then causes the stopper to be detached from the tape, then the tape is subsequently retracted back into the casing by the spring. When the user extracts the tape out to a desired measuring position, the user only needs to release the actuator, the stopper then automatic locks the tape, and the user can readily read the tape measurement.

According to the structure mentioned above, it can be seen that present invention is regarding to a stopper which comprises of an end portion, a linkage part and an actuator that are molded together into one piece, which in effect leads to simple construction and thus significantly reduced production cost for a measuring tape device. Furthermore, the stopper of present invention has its end linked to an actuator with a linkage part, where the end of the stopper, the linkage part of the stopper and the actuator are molded together into one piece, so there is no concern in regards to consistently connecting the actuator with the end of the stopper, such characteristic leads to a more reliable locking mechanism of the measuring tape device.

DETAILED DESCRIPTION OF THE PREFERRED EMBODIMENTS

Figure 1:
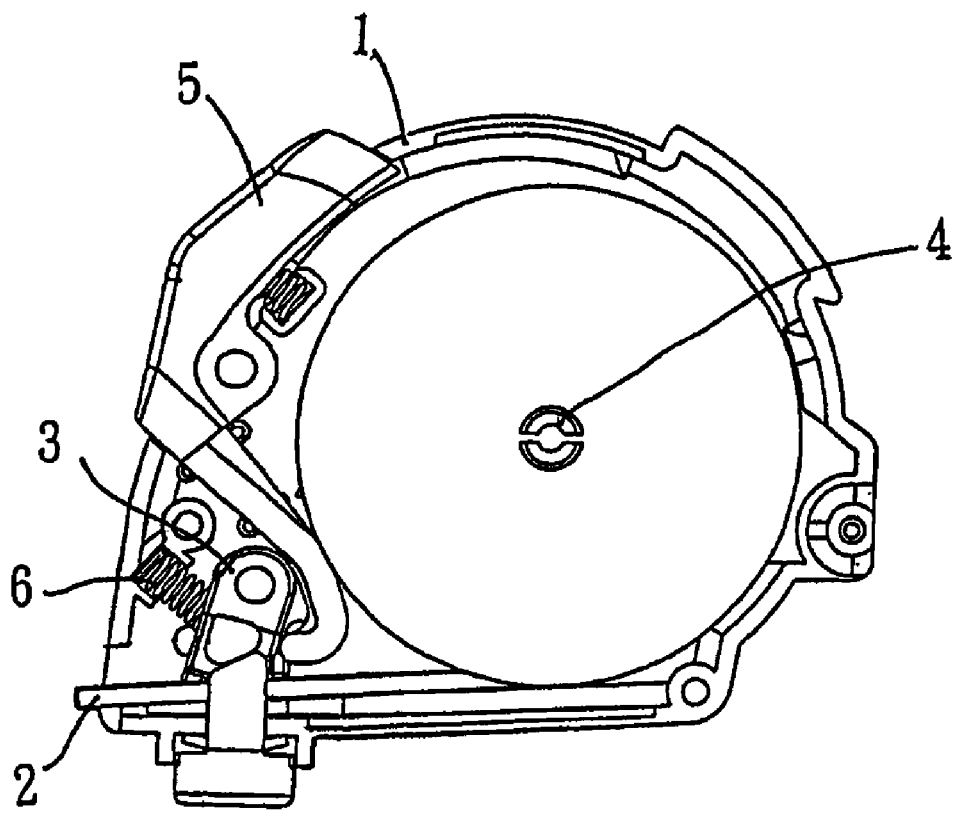
FIG. 1 is a demonstrative view showing the construction of a conventional measuring tape device with its locking mechanism.
Figure 2:
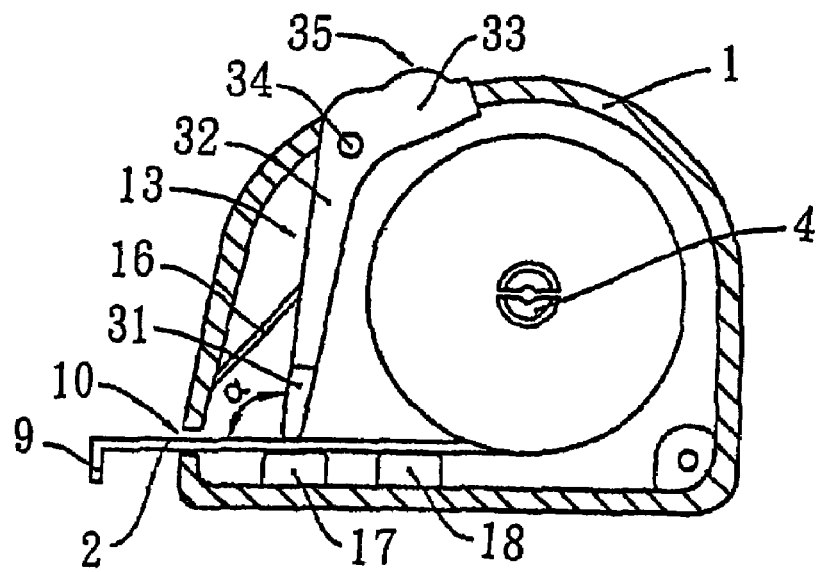
FIG. 2 is a demonstrative view showing the embodiment of the construction of a measuring tape device of present invention.

In reference to FIG. 2, it is a demonstrative view showing the embodiment of the construction of measuring tape device of present invention. The measuring tape device of the embodiment of the present invention comprises of a casing 1, there is a bobbin 4 located at the center part of the casing 1, and the bobbin 4 is attached to casing 1 by a loaded spring. Inside the casing 1 there is also a coilable tape 2, one end of the tape 2 is connected to the spring (not shown) and the tape is wound around the bobbin 4. The other end of the tape 2 is extended outside through the aperture 10 that is formed on the lower end of casing 1, and this end of the tape is also connected to a hook member 9. The section of the tape 2 positioned between the coilable tape and the hook member 9 is the linear portion of tape 2, it is located near the bottom of to casing 1.

The automatic locking mechanism of present invention is applied with a stopper 13, the stopper 13 comprises of an end piece 31, a linkage part 32, and an actuator 33, and all of which are molded together into one piece. Wherein the end 31 is positioned on top of the part of the tape 2 that is linear inside the casing 1, and the end 31 of the stopper 13 can be in direct contact with the part of the tape 2 that is linear in the casing 1. The linkage part 32 is on top of the end portion 31, with one end joined to the end portion 31 and the other end joined to the actuator 33. The linkage part 32 in present invention is a lever, and at its upper end close to the actuator 33 is a hinge joint 34. The hinge joint 34 fixates the stopper 13 in casing 1, and enables the stopper 13 to rotate; in other words the stopper 13 can be rotated around the hinge joint 34. The actuator 33 has a protruded surface 35 that acts as a press button for the user. The protruded surface 35 is covered with a slippery prevention strip. Meanwhile, the angle "α" formed between the end portion 31 of the stopper 13 and the linear part of tape 2 is greater than 90 degrees, as such, when user press the actuator 33 downward, the linkage part 32 will shift towards the wall of the casing 1. And the end portion 31 of the stopper 13 does not contact with the tape 2, the tape 2 can be freely pulled into the casing 1 by the spring inside said bobbin 4.

Below the end portion 31 of the stopper 13 is a first supporting element 17, the linear part of tape 2 can be moved around within the space between these two parts. At its natural state, the end portion 31 is in direct contact with the linear part of the tape 2, and it applies friction against the tape 2. When the end portion of stopper 13 is in contact with the tape 2, the tape 2 will shift downward. The purpose of the first supporting element 17 is to support the tape 2, so the tape 2 can be come in contact with the stopper 13 and thus, lock the tape 2 at the desired measuring position.

At the lower end of casing 1 near the aperture 10 is a component with elasticity, this component in present invention is an elastic piece 16. One end of the elastic piece 16 is fixated to the lower end of the casing 1 near the aperture 10 of the casing 1, and the other end is fixated to the middle of the linkage part 32. In its natural state, the elastic piece 16 restores the linkage part 32 to be approaching the part of tape 2 that is coiled within the casing 1, and the end portion 31 of stopper 13 comes in contact with the linear part of the tape 2 inside the casing.

In the casing 1 there is also a second supporting element 18, this element is also positioned underneath the linear part of tape 2, the linear part of tape 2 passes the top surface of block 18 when the tape moves.

In its natural state, the elastic piece 16 of the linkage portion 32 is elastically biased towards the tape 2 that is coiled within casing 1, so the end portion 31 of stopper 13 can be in direct contact with the linear part of the tape 2 inside the casing. As such, the contact between tape 2 and end portion 31 generates a friction, such friction locks tape 2 in the desired position. When a user extracts the tape 2 out to a desired measuring position, the user only need to leave the stopper 13 in its natural state, the tape 2 will be locked in place for the user to read the measurement on the tape.

Figure 3:
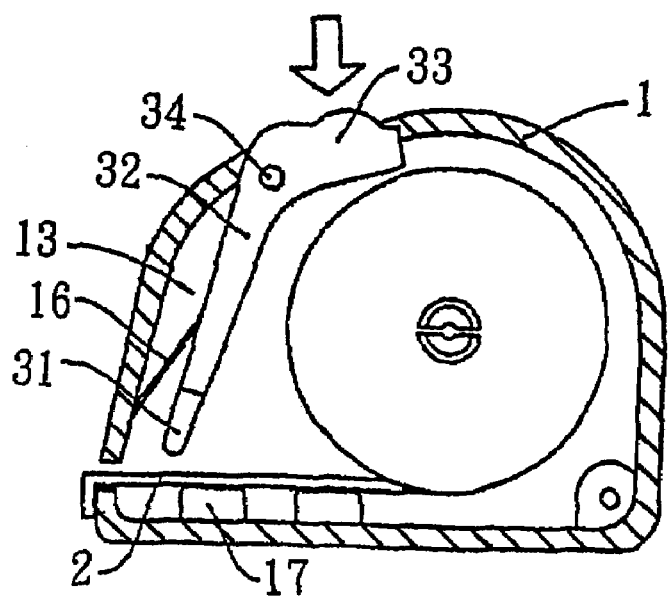
FIG. 3 is a demonstrative view showing the embodiment of the measuring tape device of present invention is in using.

When the user wants to retract the tape 2 back into the casing 1 after reading the measurement, the user just press down the actuator 33. As shown in FIG. 3, it is a demonstrative view showing the application-in-progress of present invention. When the user wants to retract tape 2, the user just press the actuator 33 in the direction indicated by the arrow shown in the drawing, the stopper 13 is then turned by the hinge joint 34, causing the linkage portion 32 shifts towards the casing 1, as such, the end portion 31 of stopper 13 is shifted away from tape 2, and tape 2 is freed from the friction that causes the tape to be locked. Tape 2 is then retracted back into casing 1 by the loaded spring inside the bobbin 4. After the force applied onto the actuator 33 is removed, the stopper 13 is moved back to its original position by the recover force of elasticity of the elastic piece 16, the tape 2 is then again locked in place.

It is considered even more effective to sheath the end portion 31 of stopper 13 with a frictional piece. Preferably the frictional piece is made of material that generates large friction against a smooth tape surface, such as rubber, or synthetic resin. As such, the friction generated between the linear part of tape 2 and the end portion 31 of stopper 13 is even greater, and this enhances the locking mechanism of the tape 2 after the tape is extracted out to a desired measuring position.

According to the above, it can be seen that the locking mechanism of the measuring tape of present invention can be achieved by the use of a stopper that is introduced in the present invention, wherein the stopper comprises of an end portion, an actuator, and a linkage portion that connects the end portion and the actuator. With such simple structure, production cost of the measuring tape device can be reduced.

In addition, the end portion, the linkage portion and the actuator are molded together in one piece, so when the actuator is applied, the linkage portion shifts towards the wall of casing, and the end portion subsequently shifts away from the tape, the tape is then free from the friction that causes the tape to be locked in place. Such construction will eliminate the concern of connecting consistently the actuator with the end portion of the stopper, and consequently it increases the effectiveness of the locking mechanism of the measuring tape device.

It is worth noting that the above is only one embodiment of present invention, there can be many form variations to its components. For example, a spring can be used in the place of an elastic piece; or the linkage portion of the stopper can be a cylinder lever or levers of other shapes; these variations do not affect the actual effectiveness of present invention during application.

In addition, the measuring tape device of present invention can be one without supporting block underneath the linear part of tape, the tape can be set above the bottom of casing, when the end portion of stopper is in contact with the linear part of the tape, the tape comes in contact with the bottom of the casing. As such, the stopper can also effectively lock the tape in its place after being extracted out to a desired measuring position.

Meanwhile, from the embodiment of above example, it is shown that the end connecting elastic piece and the casing is lower than the end connecting the elastic piece and the linkage portion. However, the device of present invention can also be made so that the end connecting the elastic piece and the casing be set higher, while the end connecting the elastic piece and the linkage portion be set lower. With this variation, the objective of present invention can also be obtained.

Finally, it is emphasized that present invention is not limited only to the embodiments described above, small variations such as changes to the angle between the linear part of tape and the end portion of the stopper, changes of material used for the frictional piece, etc., are all to be included without departing from the claims of present invention.

What is claimed is:

1. A measuring tape device comprises of:
    a casing that contains a tape;
    a bobbin that is set in the middle part of the casing along with a spring;
    a coilable tape, one end of which is connected to the spring and is wound around the bobbin, and the other end extended outside the casing through an to aperture that is formed at the lower portion of casing, and this end is also connected to a hook member;
    the measuring tape device is characterized as that it has an automatic locking mechanism, such automatic locking mechanism comprises of:
    a stopper, comprises of:
    an end portion that is placed above the linear portion of the tape inside the casing;
    an actuator that extrudes outside and settles at the surface of the casing;
    a linkage portion that connects the end portion to the actuator;
    a hinge joint, for fixating the stopper in place within the casing, and it allows the stopper to rotate; and
    an elastic member, that is placed between the casing and the linkage portion.

2. A measuring tape device as claimed in claim 1, wherein, an angle greater than 90 degrees is formed between the end portion of the stopper and the linear part of the tape extended outward.

3. A measuring tape device as claimed in claim 1, wherein, the end of the stopper is sheathed with a frictional piece.

4. A measuring tape device as claimed in claim 3, wherein, the component with elasticity can be of an elastic piece or of a spring.

5. A measuring tape device as claimed in claim 4, wherein, the linkage portion is in the form of a vertical lever.

6. A measuring tape device as claimed in claim 5, wherein, the measuring tape device further contains supporting element that is placed below the end of the stopper, the tape's linear part passes through the space between the end of the stopper and the supporting element.

7. A measuring tape device as claimed in claim 4, wherein, the linkage portion can be a cylindrical section.

8. A measuring tape device as claimed in claim 7, wherein, the measuring tape device further contains supporting element that is placed below the end of to the stopper, the tape's linear part passes through the space between the end of the stopper and the supporting piece.

* * * * *